(12) United States Patent
Sasaki

(10) Patent No.: US 10,071,772 B2
(45) Date of Patent: Sep. 11, 2018

(54) POWER UNIT MOUNTING STRUCTURE

(71) Applicant: HONDA MOTOR CO., LTD., Tokyo (JP)

(72) Inventor: Kazuma Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 199 days.

(21) Appl. No.: 15/245,461

(22) Filed: Aug. 24, 2016

(65) Prior Publication Data

US 2017/0057550 A1    Mar. 2, 2017

(30) Foreign Application Priority Data

Aug. 26, 2015    (JP) .................................. 2015-166998

(51) Int. Cl.
*B62D 21/15*    (2006.01)
*B62D 21/11*    (2006.01)

(52) U.S. Cl.
CPC ............ *B62D 21/155* (2013.01); *B62D 21/11* (2013.01)

(58) Field of Classification Search
CPC .................................................. B62D 21/155
See application file for complete search history.

(56) References Cited

U.S. PATENT DOCUMENTS

2007/0051549 A1 *    3/2007    Fukuda .................... B60K 1/00
                                                                180/232
2017/0057550 A1 *    3/2017    Sasaki .................. B62D 21/155

FOREIGN PATENT DOCUMENTS

DE    202016104729 U1 *    1/2017 ........... B62D 21/155
JP    2007090965 A    *    4/2007
JP    2007-261529 A         10/2007

* cited by examiner

*Primary Examiner* — Karen Beck
(74) *Attorney, Agent, or Firm* — Westerman, Hattori, Daniels & Adrian, LLP

(57) ABSTRACT

A power unit mounting structure of a vehicle includes a power unit 100, a sub frame 200 disposed below the power unit 100 in the vehicle height direction and at least one attaching bracket 220 for attaching the power unit 100 on the sub frame 200, the power unit 100 has an arm 210 extended from the main body portion thereof to the attaching bracket 220, a tip portion of the arm 210 is axially supported on a pair of shaft supporting portions 221 of the attaching bracket 220 with a shaft member 213 extended to the width direction of the vehicle, and the shaft supporting portion 221 of the attaching bracket 220 has fragile portions 222, 223 which break when the impact is applied such that the aria 210 of the power unit 100 shifts to the front direction.

5 Claims, 5 Drawing Sheets

POWER UNIT MOUNTING STRUCTURE

CROSS-REFERENCE OF RELATED APPLICATION

This application claims priority of Japanese Patent Application No. 2015-166998 filed in Japan on Aug. 26, 2015, the entire contents of which are incorporated herein by reference.

TECHNICAL FIELD

The present invention relates to power unit mounting structure in fuel cell vehicles and the like.

BACKGROUND OF THE INVENTION

As for fuel cell vehicles and the like, there is a structure which can secure a crushed, zone by breaking an attaching bracket which supports a front portion of a power unit, at the time of front collision and can efficiently absorb the collision energy by shaft crash or deformation of the vehicle body frame (Japanese Laid-Open Patent Publication No. 2007-261529).

In above-mentioned Japanese Laid-open Patent Publication No. 2007-261529, the structure becomes complicated so as to break the attaching bracket at the time of front collision, which leads to the increase in cost. Moreover, the attaching bracket may not be broken depending on the movement at the time of front collision, and the deformation of the vehicle body frame may be prevented, which may lead to the shortage of the absorption amount or collision energy.

SUMMARY OF THE INVENTION

The present invention aims to realize the power unit mounting structure in which the power unit can be detached with a simple structure, which allows to simplify the manufacturing process and to reduce in cost.

In order to solve the above-mentioned problem and to achieve the aim, a power unit mounting structure of the present invention is configured as below. In a vehicle comprising a power unit; a sub frame disposed below the power unit in the vehicle height direction; and at least one attaching bracket for attaching the power unit on the sub frame, the power unit has an arm extended from the main body portion thereof to the attaching bracket, a tip (front end) portion of the arm is axially supported on a pair of shaft supporting portions of the attaching bracket with a shaft member extended to the width direction of the vehicle (the vehicle width direction), and the shaft supporting portion of the attaching bracket has fragile portions which break or deform when the impact is applied such that the aria of the power unit shifts to the front direction.

According to the present invention, the power unit can be detached with the simple structure. Accordingly, it is possible to realize the power unit mounting structure which allows to simplify the manufacturing process and to reduce in cost.

BRIEF DESCRIPTION OF THE DRAWINGS

FIG. 3(*b*) is a side view of the attaching bracket in the present embodiment. The side view FIG. 3(*b*) shows a state that the power unit is not supported.

DETAILED DESCRIPTION OF THE INVENTION

Hereinafter, the embodiment of the present invention will be explained in detail with reference to the attached drawings.

The present embodiment explains the structure for attaching the power unit on the sub frame which configures the front portion of the vehicle body in the fuel cell vehicle.

Figure 1:
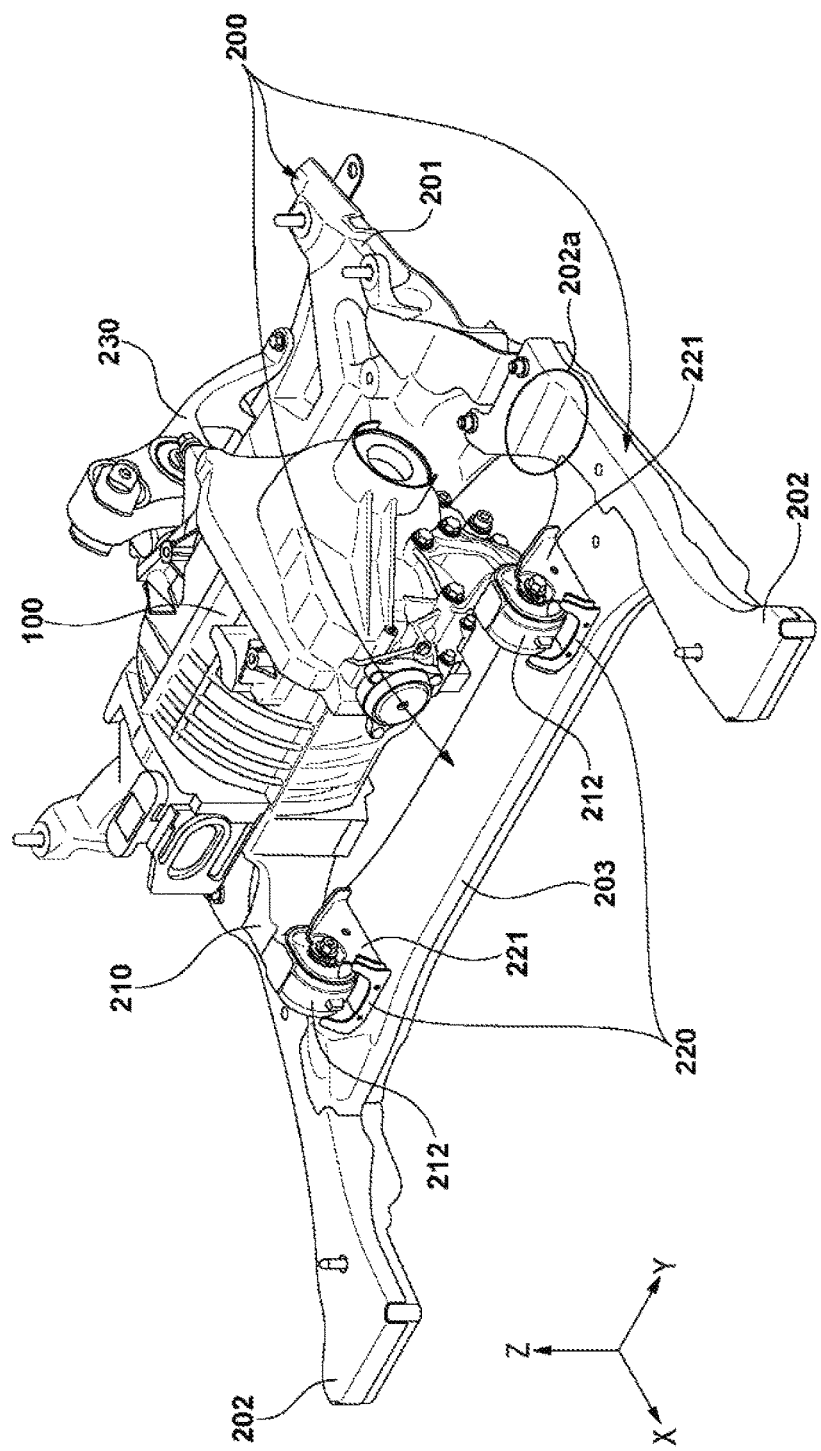
FIG. 1 is a perspective view which shows the power unit mounting structure in the present embodiment.
Figure 2A:
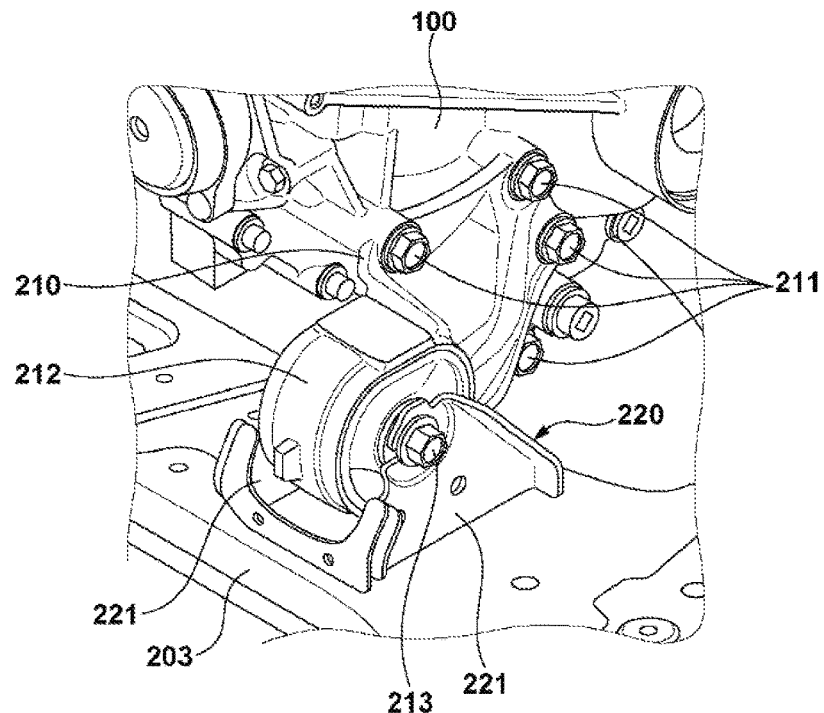
FIG. 2(*a*) is a perspective view and FIG. 2(*b*) is a front view of the attaching bracket in the present embodiment.
Figure 2B:
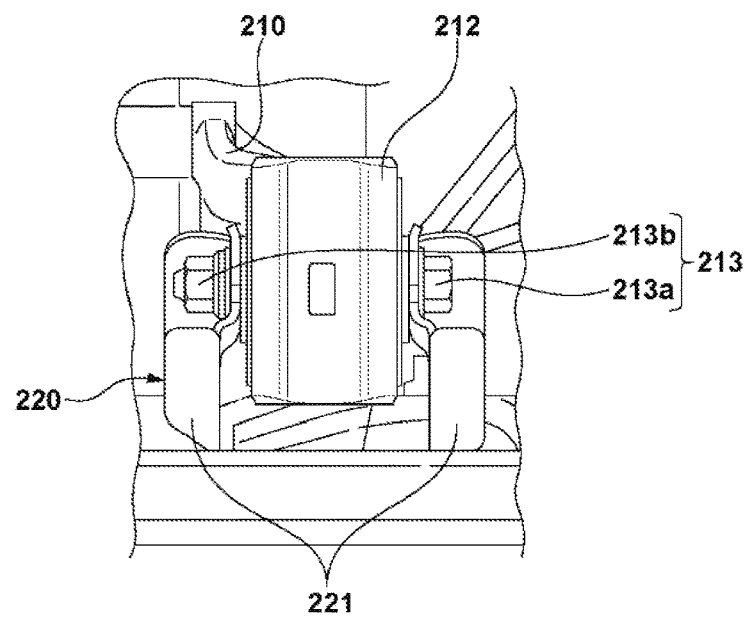
Figure 3A:
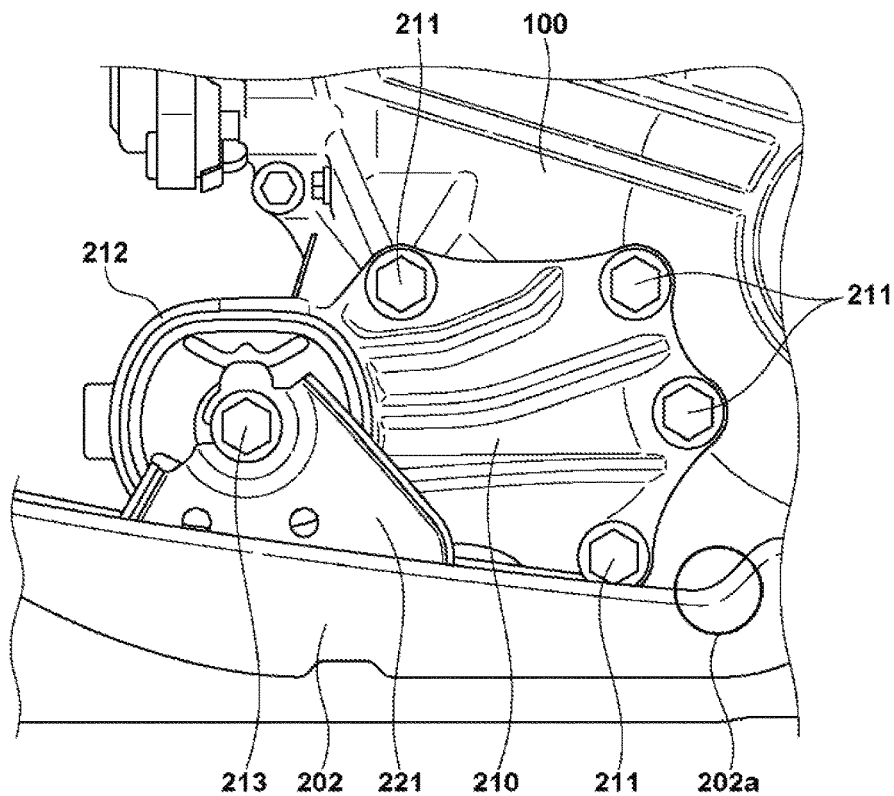
FIG. 3(*a*) is a side view of the attaching bracket in the present embodiment. The side view FIG. 3(*a*) shows a state that the power unit is supported.
Figure 3B:
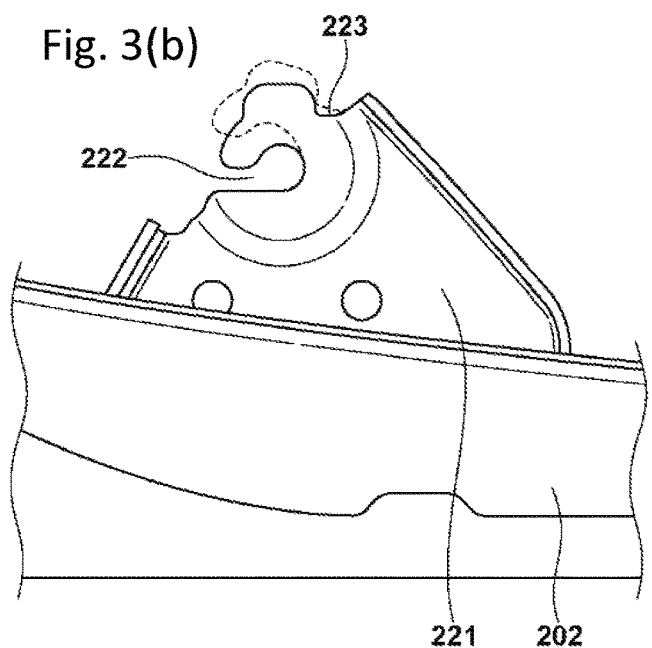
Figure 4A:
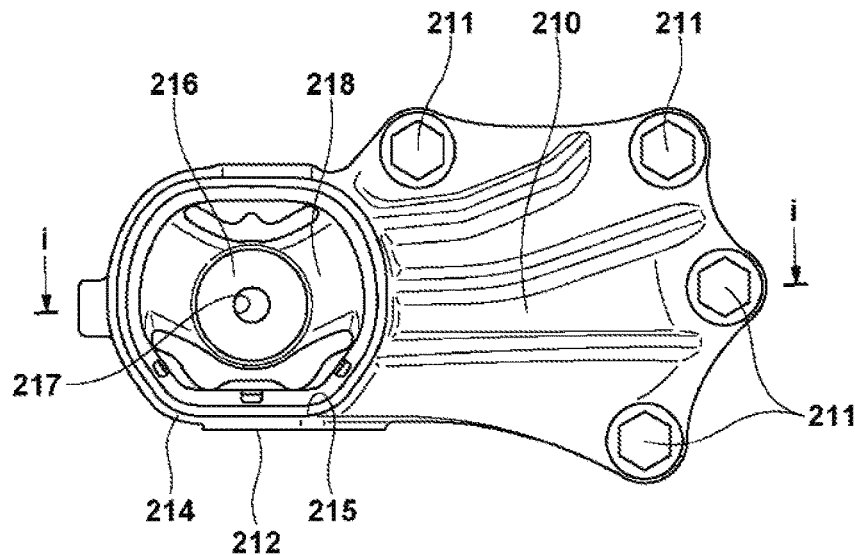
FIG. 4(*a*) is a side view and FIG. 4(*b*) is a sectional view of the attaching arm, taken along a line i-i in the present embodiment.
Figure 4B:
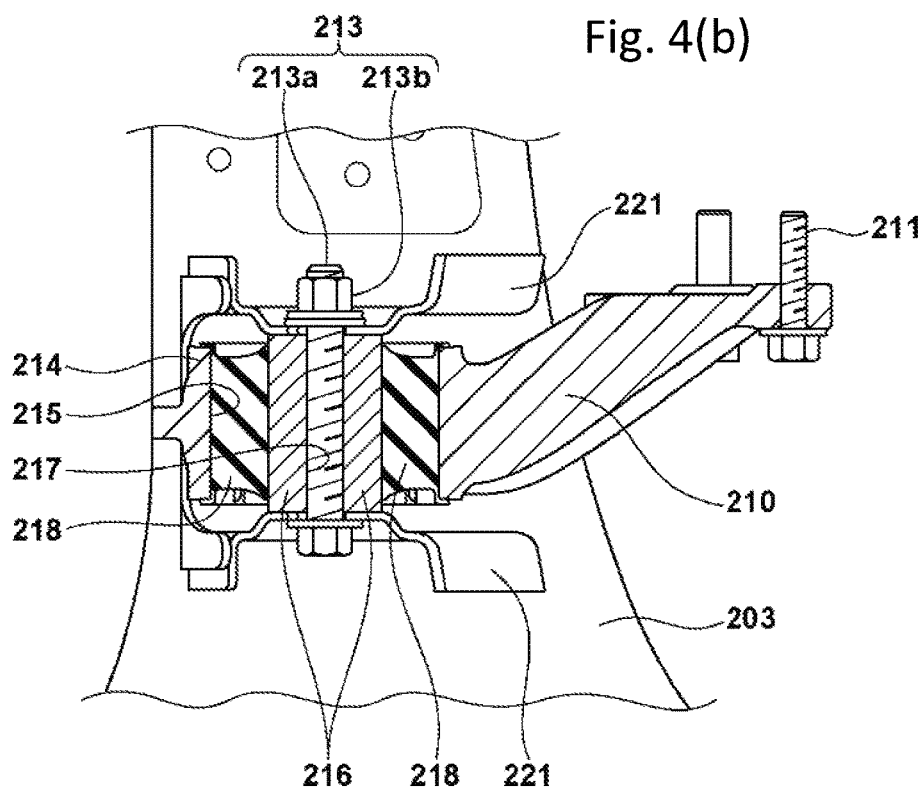
Figure 5A:
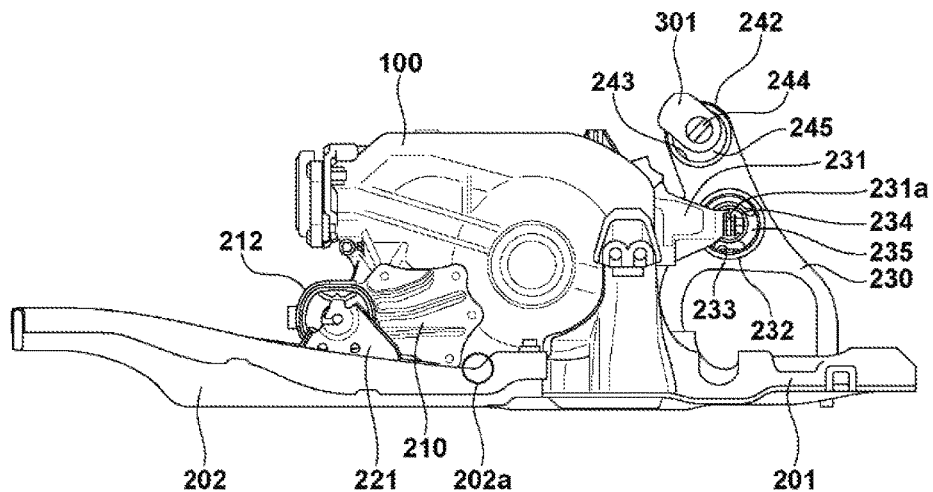
FIG. 5(*a*) is a side view of the power unit mounting structure, and FIG. 5(*b*) is a perspective view of the rear attaching bracket, in the present embodiment.
Figure 5B:
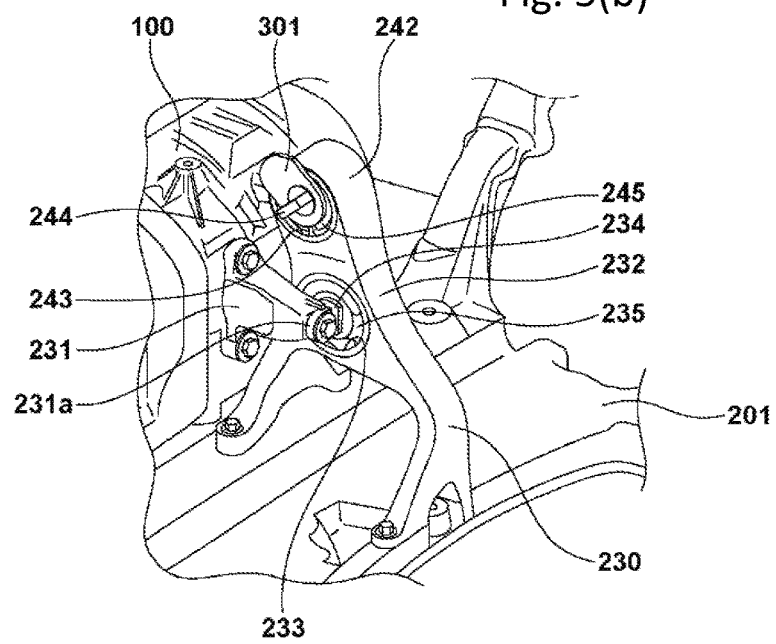

FIG. 1 is the perspective view showing the power unit mounting structure in the present embodiment. FIG. 2 is the perspective view (a) and the front view (b) of the attaching bracket in the present embodiment. FIG. 3 is the side view of the attaching bracket in the present embodiment. The side view (a) in FIG. 3 shows the state that the power unit is supported, and the side view (b) in FIG. 3 shows the state that the power unit is not supported. FIG. 4(*a*) is the side view and FIG. 4(*b*) is the sectional view of the attaching arm taken along a line x-x, in the present embodiment. FIG. 5(*a*) is the side view of the power unit mounting structure, and FIG. 5(*b*) is the perspective view of the rear attaching bracket, in the present embodiment.

For example, as shown in the present embodiment, a power unit 100 of the fuel cell vehicle is configured with a combination of an internal combustion engine and an electric motor.

As shown in FIG. 1, the power unit 100 is attached to attaching brackets 220, 230 provided on a sub frame 200 in the longitudinal direction (X direction, i.e., the vehicle front-rear direction perpendicular to the vehicle width direction Y) of the vehicle body such that the sub frame 200 is disposed below the power unit 100 relative to the vehicle height direction (Z direction).

The attaching brackets 220, 230 has the front attaching bracket 220 supporting the front portion of the power unit 100 and the rear attaching bracket 230 supporting the rear portion of the power unit 100.

The sub frame 200 is extended below the front side frame configuring an unillustrated framework on the front side portion of the vehicle body to the vehicle height direction. The sub frame has a first sub frame 201 connected to the bending portion of the front side frame to the lower direction, a pair of second sub frames 202 extended forward in the longitudinal direction of the vehicle body from both sides of the first sub frame 201 in the width direction of the vehicle (Y direction), and a beam-shaped third sub frame 203 stretched between the pair of second sub frames 202.

The second sub frame 202 has a bent portion 202*a* which is configured so as to be bent upward when the impact due to front collision and the like is applied from the front direction of the vehicle body. The bent portion 202*a* is configured so as to lower the rigidity than that of the other portion of the sub frame 200 by means such as forming a recessed portion; a notching portion; and a height difference portion on the part thereof, or making the cross sectional area smaller, or otherwise, reducing the plate thickness. When the impact due to front collision and the like is applied from the front direction of the vehicle body, the bent portion 202a of the second sub frame 202 can bend just after or at the approximately same time when the front attaching arm 210 of the power unit 100 is detached from the front attaching bracket 220.

At least one front attaching bracket 220 is provided on the third sub frame 203 in the width direction of the vehicle so as to attach the power unit 100 on the sub frame 200. As; shown as an example in the drawing, the right and left pair of front attaching brackets 220 are provided so as to be separated in the width direction of the vehicle. Depending on the structure and weight of the power unit 100 and the number of the arms extended from the power unit 100, one or more than three front attaching brackets may be provided.

As shown in FIGS. 2 to 4, the power unit 100 has the front attaching arm 210 extended from the unit main body to the front direction of the vehicle body. The front attaching arm 210 is configured such that the rear end portion thereof is fixed on both side portions of the power unit 100 in the width direction of the vehicle with a plurality of bolts 211.

In a state an extended portion 212 annularly extended in the front end portion of the front attaching arm is sandwiched by the right and left pair of shaft supporting portions 221 of the front attaching bracket 220, the front attaching arm 210 is axially supported on a shaft supporting portion 221 such that inserting a long shaft member 213 in the width direction of the vehicle allows the movements in a certain level due to the rotation and the vibration. For example, the shaft member 213 includes a bolt 213a. The front attaching arm is fixed on the shaft supporting portion 221 of the front attaching bracket 220 by fastening the other end portion with a nut 213b.

As shown in FIG. 3(*b*), fragile portions 222, 223 are provided on the shaft supporting portion 221 of the front attaching bracket 220 so as to be breakable to the front direction of the vehicle body when a predetermined force is applied. The fragile portion includes the slit 222 and the groove portion 223. However, the fragile portion may be configured with at least any one of the slit 222 and the groove portion 223. The width of the slit 222 is formed so as to be wider than the diameter of the shaft member 213.

As mentioned above, the fragile portions 222, 223 are provided on the shaft supporting portion 221 of the front attaching bracket 220. Accordingly, when the bent portion 202a of the second sub frame 202 bends to the upper direction and shifts the front attaching arm 210 of the power unit 100 to the front direction due to the impact energy at the time of front collision and the like, and the shaft supporting portion 221 breaks as shown in the dashed line of FIG. 3(*b*). The power unit 100 is detached from the shaft supporting portion 221 of the front attaching bracket 220. Accordingly, the sub frame 200 can secure the bent portion and the crushed zone and can increase the absorption amount of impact energy.

Moreover, the power unit 100 can be detached with the simple structure in which the fragile portions 222, 223 are provided on the shaft supporting portion 221 of the front attaching bracket 220, which allows to simplify the manufacturing process and to reduce in cost.

Furthermore, the fragile portions 222, 223 are configured with the simple structure such as the slit 222 or the groove portion 223. Accordingly, the structure can be simplified such that the power unit 100 is detached due to the impact of front collision, and the manufacturing cost can be reduced.

For example, the front attaching arm 210 extended from the main body side of the power unit 100 is made of aluminum alloy. The board thickness of the front attaching arm 210 is thicker with higher rigidity than the board thickness of the right and left pair of shaft supporting portions 221 of the sub frame 200.

As mentioned above, the front attaching arm 210 in the power unit 100 side has higher rigidity than that of the shaft supporting portion 221 of the front attaching bracket 220. Accordingly, when the power unit 100 shifts to the front direction due to the impact energy at the time of front collision and the like, the shaft supporting portion 221 can be surely broken and the power unit 100 can easily be detached from the shaft supporting portion 221.

As shown in FIG. 4, the extended portion 212 of the front attaching arm 210 has an outer shape portion 214 forming an elliptical opening portion 215. A cylindrical metal bearing member 216 is provided on the opening portion 215 such that an insertion hole 217 is formed for inserting the shaft member 213. An elastic body 218 is provided so to be embedded in the space in the longitudinal direction of the vehicle between the inner periphery surface of the opening portion 215 and the outer periphery surface of the bearing member 216 so as to keep the bearing member 216 inside the opening portion 215. For example, the elastic body 218 is an elastic member including rubber and the like.

As mentioned above, the front attaching arm 210 in the power unit 100 side is rotatably supported on the insertion hole 217 of the bearing member 216 through the elastic body 218. Accordingly, the elastic body 218 can efficiently absorb and damp the vibration of the power unit 100.

Moreover, the elastic body 218 supports the bearing member 216 in the longitudinal direction of the vehicle body. Accordingly, the impact at the time of front collision can be directly transmitted from the front attaching arm 210 to the shaft supporting portion 221, which allows the power unit 100 to be easily detached to the front direction.

Furthermore, as shown in FIG. 5, the rear portion of the power unit 100 is also supported on a rear attaching bracket 230 extended from the rear portion of the first sub frame 201 to the upper direction. An extended portion 232 is formed on the rear attaching bracket 230 so as to have the same configuration as the extended portion 212 of the front attaching arm 210, and the rear attaching arm 231 extended from the rear portion of the power unit 100 is axially supported so as to allow the movements in a certain level due to the rotation or the vibration.

The extended portion 232 of the rear attaching bracket 230 forms a circular opening portion 233. The opening portion 233 has a cylindrical metal bearing member 234 on which an insertion hole for inserting the shaft member 231a of the rear attaching arm 231 is formed, an elastic body 235 which is provided so to be embedded in the space in the longitudinal direction of the vehicle between the inner periphery surface of the opening portion 233 and the outer periphery surface of the bearing member 234 so as to keep the bearing member 234 inside the opening portion 233.

Moreover, an unillustrated fuel cell unit is disposed on the upper portion of the power unit 100. An extended portion 242 is provided on the upper end portion of the rear attaching bracket 230 so as to be similarly configured with an open portion 243; a bearing member 244; and an elastic body 245 as mentioned above. The extended portion 242 axially supports an attaching arm 301 provided on the rear portion of the fuel cell unit.

The above-mentioned embodiment is an example as a realization means of the present invention. The present invention can be applied to the modifications or variations within the scope of the invention.

The present embodiment shows the mounting structure of the power unit for fuel cell vehicle. However, the present embodiment may be applied not only to this but also to other members except the power unit attached to the body front portion. It also may be used to other things except automobile.

SUMMARY OF THE EMBODIMENTS (Configuration 1)

A power unit mounting structure configured such that in a vehicle comprising a power unit 100, a sub frame 200 disposed below the power unit 100 in the vehicle height direction, and at least one attaching bracket 220 on the sub frame 200 for attaching the power unit 100, the power unit 100 has an arm 210 extended from the main body portion to the attaching bracket 220, a tip portion of the arm 210 is axially supported on a pair of shaft supporting portions 221 of the attaching bracket 220 with a shaft member 213 extended to the width direction of the vehicle, and the shaft supporting portion 221 of the attaching bracket 221 has the fragile portions 222, 223 which break when the impact is applied such that the arm 210 of the power unit 100 shifts to the front direction.

According to the configuration 1, the fragile portions 222, 223 are provided on the shaft supporting portion 221 of the attaching bracket 220. Accordingly, when the sub frame 200 is bent and deformed such that the arm 210 of the power unit 100 shifts to the front direction due to the impact energy at the time of front collision and the like, the fragile portions 222, 223 are broken, and the power unit 100 is detached from the shaft supporting portion 221. Accordingly, the sub frame 200 can secure the bent portion and the crushed zone and can increase the absorption amount of impact energy.

Moreover, the power unit 100 can be detached with the simple structure in which the fragile portions 222, 223 are provided on the shaft supporting portion 221 of the attaching bracket 220, which allows to simplify the manufacturing process and to reduce in cost.

(Configuration 2)

In the above-mentioned configuration 1, the fragile portions 222, 223 includes at least any one of the slit 222 and the groove portion 223.

According to the configuration 2, the fragile portions 222, 223 are configured with the simple structure such as the slit 222 or the groove portion 223. Accordingly, the structure can be simplified such that the power unit 100 is detached due to the impact at the time of front collision, and the manufacturing cost can be reduced.

(Configuration 3)

In the above-mentioned configuration 1 or 2, the sub frame 200 has the bent portion 202a.

According to the configuration 3, the power unit 100 is detached from the attachment bracket 220, due to the impact at the time of front collision. Simultaneously, the impact energy can be absorbed by bending the sub frame 200.

(Configuration 4)

In any one of the above-mentioned configurations 1 to 3, the rigidity of the arm 210 is higher than the rigidity of the shaft supporting portion 221 of the attaching bracket 220.

According to the configuration 4, the arm 210 in the power unit 100 side has higher rigidity than that of the shaft supporting portion 221 of the front attaching bracket 220. Accordingly, when the power unit 100 shifts to the front direction due to the impact energy at the time of front collision and the like, the fragile portions 222, 223 can be surely broken, and the power unit 100 can easily be detached from the shaft supporting portion 221.

(Configuration 5)

In any one of above-mentioned configurations 1 to 4, the opening portion 215 is provided on the tip portion of the arm 210, the metal member 216 having the insertion hole 217 for the shaft member 213, and the elastic body 218 which keeps the metal member 216 inside the opening portion 215 are provided inside the opening portion 215, the elastic body 218 supports the metal member 216 in the longitudinal direction of the vehicle.

According to the configuration 5, the arm 210 in the power unit 100 side is rotatably supported on the insertion hole 217 of the metal member 216 through the elastic body 218. Accordingly, the elastic body 218 can efficiently absorb and damp the vibration of the power unit 100.

Moreover, the elastic body 218 supports the metal member 216 in the longitudinal direction of the vehicle body. Accordingly, the impact at the time of front collision can be directly transmitted from the arm 210 to the shaft supporting portion 221, which allows the power unit 100 to easily fall off to the front direction.

DESCRIPTION OF REFERENCE NUMERALS

100 . . . power unit
200 . . . sub frame
210 . . . front attaching arm
220 . . . front attaching bracket
221 . . . shaft supporting portion
222, 223 . . . fragile portions

The invention claimed is:

1. A power unit mounting structure of a vehicle, comprising:
    a power unit having an main body and an extending arm which extends from the main body and has a front portion to be supported by a vehicle body;
    a sub frame of the vehicle body disposed below said power unit in a vehicle height direction; and
    at least one attaching bracket provided to said sub frame and attached to the front portion of the extending arm of said power unit, thereby supporting said power unit, wherein
    the at least one attaching bracket is provided with a shaft member and a pair of shaft supporting portions which support axial ends of the shaft member in a vehicle width direction, the shaft member axially supporting the front portion of said extending arm, and
    the pair of shaft supporting portions of said attaching bracket have fragile portions configured to break or deform, when an impact is applied thereto, so as to allow the extending arm of said power unit to move toward a front side of the vehicle.

2. The power unit mounting structure according to claim 1, wherein said fragile portions comprise at least one of a slit and a groove portion.

3. The power unit mounting structure according to claim 1, wherein said sub frame has a bent portion.

4. The power unit mounting structure according to claim 1, wherein said extending arm has a rigidity higher than a rigidity of the shaft supporting portions of said attaching bracket.

5. The power unit mounting structure according to claim 1, wherein the front portion of said extending arm has an axially opened hole, an elastic body is coaxially fitted into said axially opened hole, a metal member is coaxially fitted into the elastic body and has an insertion hole into which said shaft member is inserted, such that said elastic body holds said metal member in a vehicle front-rear direction.

\* \* \* \* \*